US012755048B2

(12) United States Patent
Han

(10) Patent No.: US 12,755,048 B2
(45) Date of Patent: *Oct. 6, 2026

(54) QUERY INFORMATION PROCESSING METHOD FOR FULLY HOMOMORPHIC ENCRYPTED DATABASE USING PLAINTEXT INDEX AND COMPUTING DEVICE FOR PERFORMING THE SAME

(71) Applicant: Supergate Co., Ltd., Seoul (KR)

(72) Inventor: Seung Min Han, Seoul (KR)

(73) Assignee: Supergate Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/820,782

(22) Filed: Aug. 30, 2024

(65) Prior Publication Data

US 2025/0077700 A1 Mar. 6, 2025

(30) Foreign Application Priority Data

Aug. 31, 2023 (KR) ........................ 10-2023-0115045

(51) Int. Cl.

*G06F 21/62* (2013.01)
*H04L 9/00* (2022.01)
*H04L 9/08* (2006.01)

(52) U.S. Cl.

CPC .......... *G06F 21/6227* (2013.01); *H04L 9/008* (2013.01); *H04L 9/0836* (2013.01)

(58) Field of Classification Search

CPC ............. G06F 21/6227; G06F 16/2458; G06F 16/2282; G06F 16/24554; G06F 16/248; G06F 16/24537; H04L 9/008; H04L 9/0836

See application file for complete search history.

(56) References Cited

U.S. PATENT DOCUMENTS

| | | | |
|---|---|---|---|
| 9,361,479 | B2 | 6/2016 | Lesavich |
| 9,608,817 | B2 | 3/2017 | Gentry |
| 10,038,562 | B2 | 7/2018 | Gajek |
| 10,489,604 | B2 | 11/2019 | Yoshino |
| 10,778,409 | B2 | 9/2020 | Cheon |

(Continued)

FOREIGN PATENT DOCUMENTS

| | | | |
|---|---|---|---|
| CN | 116975886 A | * 10/2023 | ........... G06F 21/602 |
| EP | 3264669 A1 | 1/2018 | |

OTHER PUBLICATIONS

Notice of Allowance dated Feb. 3, 2026, issued in U.S. Appl. No. 18/821,048 (15 pages).

(Continued)

*Primary Examiner* — Lawrence Truong
(74) *Attorney, Agent, or Firm* — WHDA, LLP

(57) ABSTRACT

According to the present disclosure, a query information processing method of a database performed on a computing device includes: pre-building a plaintext index corresponding to a fully homomorphic encrypted structured database; generating an encryption index by homomorphically encrypting the plaintext index; identifying query information requested from a client; indexing the encryption index in response to the query information; acquiring search result data through a homomorphic operation corresponding to a result value indexed by the encryption index; and providing the search result data to the client.

13 Claims, 8 Drawing Sheets

(56) References Cited

U.S. PATENT DOCUMENTS

| | | | | |
|---|---|---|---|---|
| 10,812,252 | B2 | 10/2020 | Laine | |
| 11,601,258 | B2 | 3/2023 | Carr | |
| 2021/0357521 | A1* | 11/2021 | Trepetin | G06F 21/6254 |
| 2022/0116200 | A1* | 4/2022 | Carr | H04L 9/0643 |
| 2023/0109352 | A1 | 4/2023 | Wang | |
| 2024/0297778 | A1* | 9/2024 | Kim | H04L 9/008 |

OTHER PUBLICATIONS

Office Action dated Jun. 10, 2026, issued in counterpart Korean Patent Application No. 10-2023-0115045 with English translation (15 pages).

* cited by examiner

QUERY INFORMATION PROCESSING METHOD FOR FULLY HOMOMORPHIC ENCRYPTED DATABASE USING PLAINTEXT INDEX AND COMPUTING DEVICE FOR PERFORMING THE SAME

BACKGROUND

1. Field

The present disclosure relates to a computing device for processing homomorphic encryption and an operating method thereof, and more particularly, to a query information processing method and device using a fully homomorphic encrypted database.

2. Description of Related Art

Encryption systems such as Rivest, Shamir, and Adleman (RSA), elliptic curve cryptography (ECC), and advanced encryption standard (AES) requires a process of decrypting a ciphertext into plaintext in order to perform operation processing on the ciphertext, and there is a possibility that information may be leaked during the decryption process.

A homomorphic encryption technology devised to solve this problem uses mathematical characteristics called homomorphic operation to enable combination and operation processing on encrypted data, thereby preventing information leakage during the decryption process. In other words, the homomorphic encryption allows arbitrary operations on the ciphertexts to directly perform operations on the encrypted data without a separate decryption process, thereby improving the stability of the messages.

Usually, the plaintext and ciphertext of the fully homomorphic encryption are composed in the form of polynomial ring, and methods of improving an operation speed by enabling the multiple data to be stored in one ciphertext to perform a single instruction multiple data (SIMD) operation and a parallel operation on multiple data are being proposed. In particular, the SIMD is a method of packing data within specifications defined by ciphertext generation parameters and mainly padding the remaining space with 0, and libraries known as HElib, SEAL, and HEAAN PALISADE implement fully homomorphic encryption.

However, there is a defined standard for performing an SIMD operation on a fully homomorphic encrypted database, and data should be stored and operated according to a structure for the standard. Here, when a data format of the device is not identical to this structure, there is a problem of unnecessary storage space being required when performing data encryption.

As a result, when these existing methods are maintained, storage spaces of users requesting queries are not only excessively required due to the continuous increase in the size of the database, but the number of encrypted messages in the data search results will also increase, thereby causing problems such as data processing speed delay, server transmission delay, and network load.

SUMMARY

The present disclosure provides a query information processing method capable of reducing a data size of a query search result and improving transmission efficiency accordingly by generating a plaintext index using a key value of a record on which a data value of a fully homomorphic encrypted structured database is dependent and efficiently performing a search query using an encryption index that encrypts the plaintext index, and a computing device for performing the same.

According to an aspect of the present disclosure, a query information processing method of a database performed on a computing device includes: pre-building a plaintext index corresponding to a fully homomorphic encrypted structured database; generating an encryption index by homomorphically encrypting the plaintext index; identifying query information requested from a client; indexing the encryption index in response to the query information; acquiring search result data through a homomorphic operation corresponding to a result value indexed by the encryption index; and providing the search result data to the client.

According to another aspect of the present disclosure, a computing device includes: a processor; and a memory communicating with the processor, in which the memory stores instructions that cause the processor to perform operations, and the operations include: an operation of pre-building a plaintext index corresponding to a fully homomorphic encrypted structured database; an operation of generating an encryption index by homomorphically encrypting the plaintext index; an operation of identifying query information requested from a client; an operation of indexing the encryption index in response to the query information; an operation of acquiring search result data through a homomorphic operation corresponding to a result value indexed by the encryption index; and an operation of providing the search result data to the client.

According to still another aspect of the present disclosure for achieving the above-described object, a computer program stored in a computer-readable recording medium may include a program code for executing the above-described operation method.

DETAILED DESCRIPTION

The following description illustrates only a principle of the present disclosure. Therefore, those skilled in the art may implement the principle of the present disclosure and invent various apparatuses included in the spirit and scope of the present disclosure although not clearly described or illustrated in the present specification. In addition, it is to be understood that all conditional terms and embodiments mentioned in the present specification are obviously intended only to allow those skilled in the art to understand a concept of the present disclosure in principle, and the present disclosure is not limited to embodiments and states particularly mentioned as such.

The above-described objects, features, and advantages will become more obvious from the following detailed description associated with the accompanying drawings. Therefore, those skilled in the art to which the present disclosure pertains may easily practice a technical idea of the present disclosure.

Further, in describing the present disclosure, when it is decided that a detailed description of the well-known technology associated with the present disclosure may unnecessarily make the gist of the present disclosure unclear, it will be omitted.

Various embodiments of the present disclosure will be described with reference to the accompanying drawings.

Figure 1:
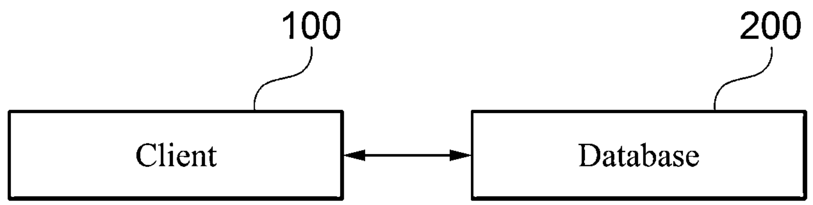
FIG. 1 is a block diagram for schematically describing a system according to an embodiment of the present disclosure.

FIG. 1 is a block diagram schematically illustrating an overall system according to an embodiment of the present disclosure.

Referring to FIG. 1, a system according to an embodiment of the present disclosure may be configured as a system that collects search result data corresponding to a query of a client 100 from a homomorphic encrypted database stored on a database 200, and provides the search result data through the client 100.

To this end, the database 200 may be a server that stores and manages one or more data built in advance to provide data to the client 100 in a fully homomorphic encrypted form, and an example thereof may include a data center, a database management system server, a storage server, etc.

The system of the present disclosure configured in this way may be configured as a system that connects the client 100 device and the database 200 device as individual computing devices, or may be installed and executed in a service form on the same server or computing device, respectively. In another embodiment of the present disclosure, each computing device may be executed as a virtual machine in a cloud computing environment.

In this system configuration, the database 200 may pre-build a plaintext index corresponding to a fully homomorphic encrypted structured database and homomorphically encrypt the plaintext index to generate an encryption index.

When the query information requested from the client 100 is identified, the database 200 may perform an operation to index the encryption index in response to the query information, acquire search result data through a homomorphic operation corresponding to the result value indexed by the encryption index, and provide the search result data to the client 100.

By the plaintext index and encryption index-based index process, it is possible to efficiently process queries while minimizing an unnecessary storage space and reduce the maximum number of ciphertexts provided as query search results. Accordingly, a specific data processing process using the embodiment of the present disclosure will be described in detail with reference to FIG. 2.

Figure 2:
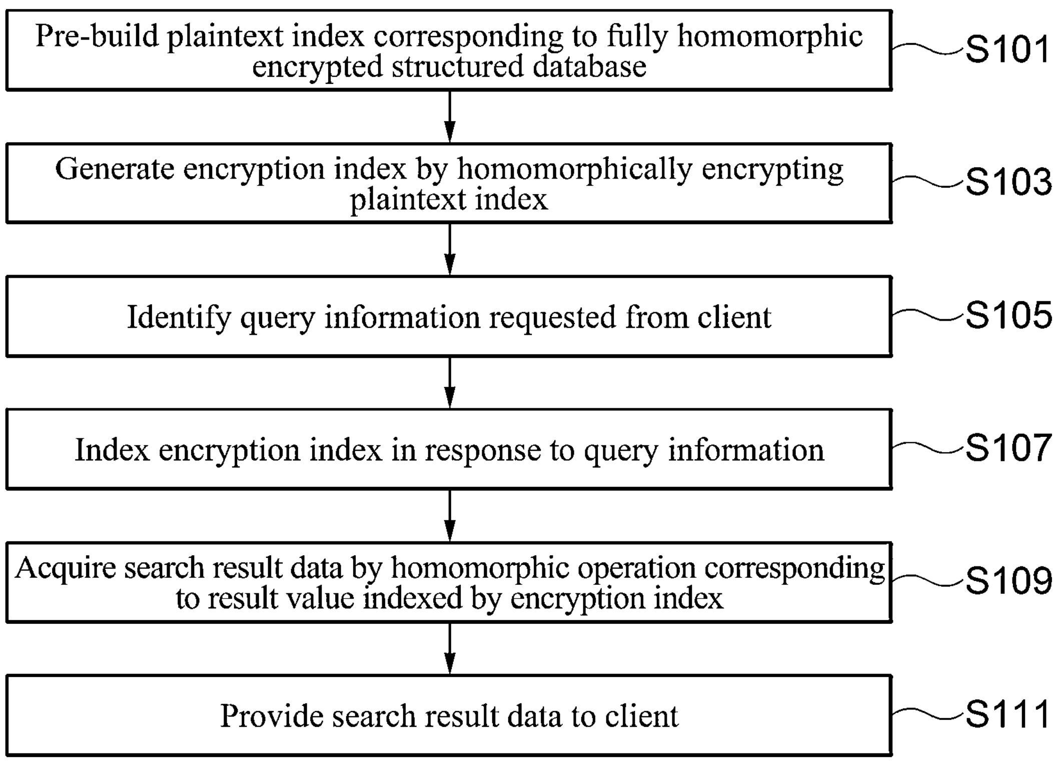
FIG. 2 is a flow diagram for describing a method for operating a computing device according to an embodiment of the present disclosure.
Figure 3:
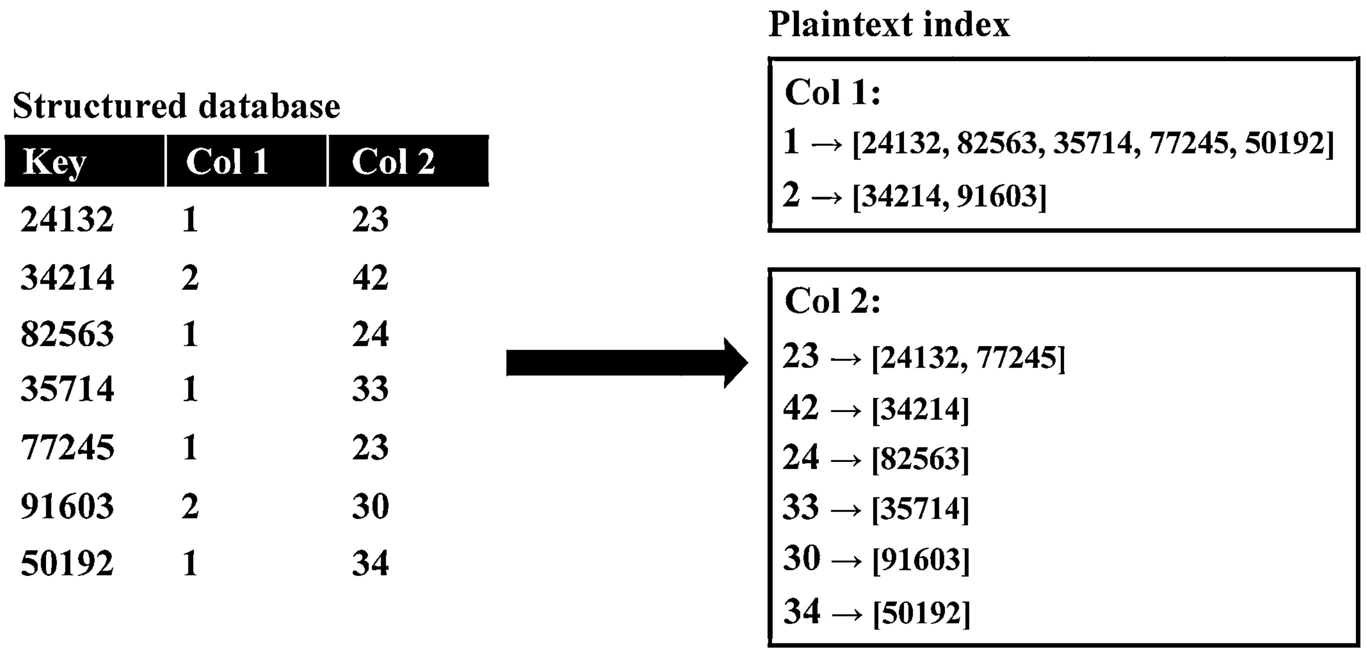
FIG. 3 is a diagram for exemplarily describing a process of generating a plaintext index according to an embodiment of the present disclosure.
Figure 4:
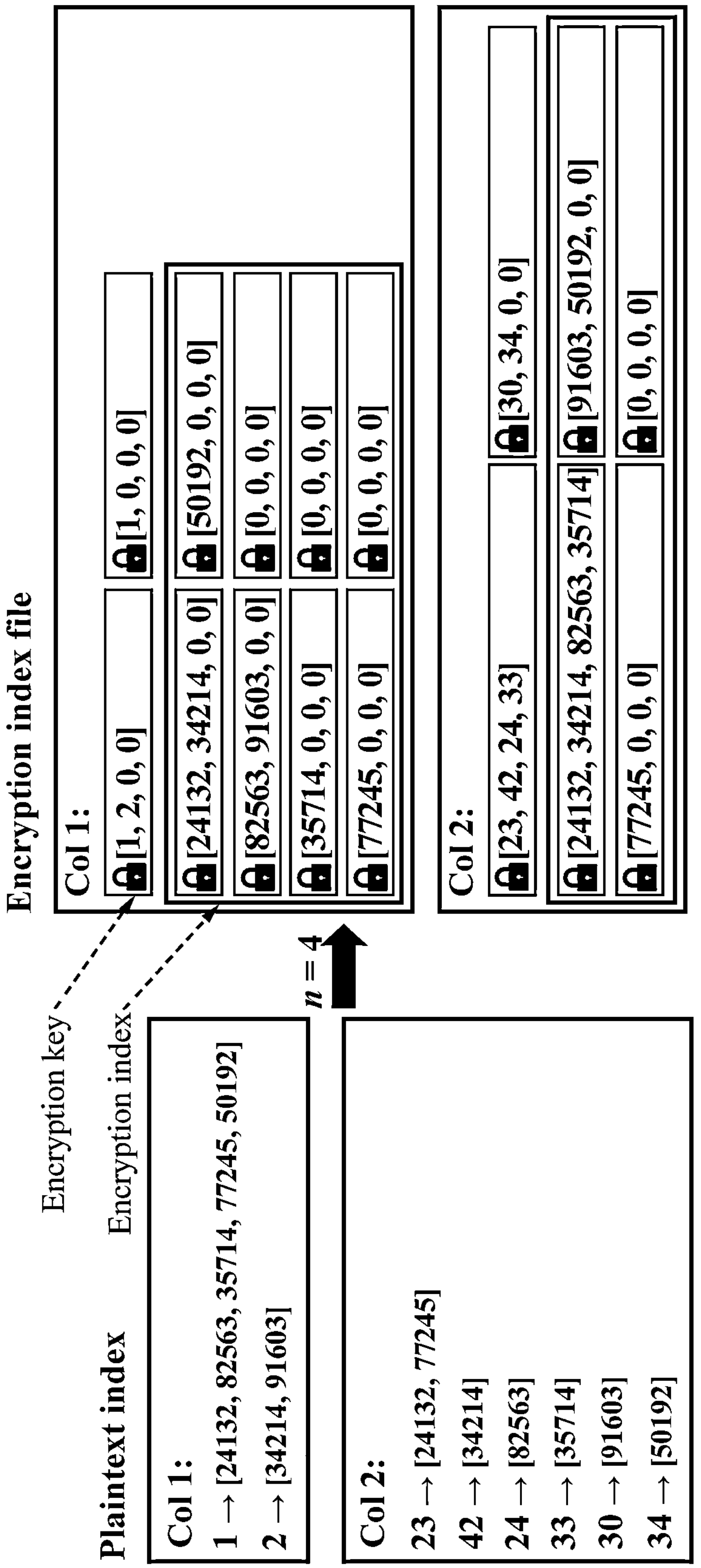
FIG. 4 is a diagram for exemplarily describing an encryption index of a plaintext index according to an embodiment of the present disclosure.

FIG. 2 is a flow diagram for describing a method for operating a computing device according to an embodiment of the present disclosure, FIG. 3 is a diagram for exemplarily describing a process of generating a plaintext index according to an embodiment of the present disclosure, and FIG. 4 is a diagram for exemplarily describing an encryption index of a plaintext index according to an embodiment of the present disclosure.

First, referring to FIG. 2, a computing device according to an embodiment of the present disclosure may perform an operation of the database 200 that processes a query information-based request from the client 100 and provides search result data, and thus, the operation of the database 200 will be mainly described.

More specifically, first, the database 200 pre-builds a plaintext index corresponding to a fully homomorphic encrypted structured database (S101).

More specifically, for example, the fully homomorphic encrypted plaintext and ciphertext stored in database 200 are configured in the form of a polynomial ring, and the number of data that may be stored in one ciphertext may be pre-designated as n according to the highest order of the polynomial ring determined by a ciphertext parameter setting value.

In the case of the conventional method, when the fully homomorphic encryption with n designated in this way is performed on a structured database with rows R and columns C, the technologies described as the related art described above are typically processed in two methods.

The first method is a method of generating and storing each data row of the structured database as one ciphertext, and the total number of ciphertexts may be generated as $R*\lceil C/n \rceil$.

In addition, the second method is a method of generating ciphertexts for each data column of the structured database, and the total number of ciphertexts may be generated as $C*\lceil R/n \rceil$.

Here, referring to FIG. 3, the database 200 may generate a plaintext index that collects key values of records on which the data values depend for each column of a fully homomorphic encrypted structured database and for each data value existing in the column.

In the plaintext index generated in this way, when the total number of records may be defined as K, and the number of sets of key values of each record may be defined as [V_1, . . . , V_K], and the maximum value among them may be defined as V_MAX, the relationship between each number and the R value, which is the number of rows in the existing structured database, may be represented by the following Mathematical Expression 1.

$$K \le R,\ \sum_{i\in[1,K]} V_i = R,\ V_{MAX} \le R - K + 1 \quad \text{[Mathematical Expression 1]}$$

Referring to the plaintext index configured in FIG. 3, for K, [V_1, . . . , V_K] of Col 1 corresponding to the structured database, it may have values of K=2, [V_1, V_2]=[5, 2], and for K, [V_1, . . . , V_K] of Col 2, it may have values of K=6, [V_1, V_2, V_3, V_4, V_5, V_6]=[2, 1, 1, 1, 1].

Regarding this, referring back to FIG. 2, the database 200 homomorphically encrypts the plaintext index to generate the encryption index (S103).

Here, by generating the encryption index that homomorphically encrypts the plaintext index, the comparison and search results for search queries may be efficiently derived with a small storage space. The process of generating an encryption index for a more specific plaintext index may be described with reference to FIG. 4.

First, variable settings such as Mathematical Expression 2 below may be processed.

$$X = \text{if } (n < V_{MAX})\text{: } n\text{, else: } \min(K, V_{MAX}) \quad \text{[Mathematical Expression 2]}$$

$$Y = \left\lceil \frac{\sum_{i \in [1,K]} \left\lceil \frac{V_i}{X} \right\rceil}{n} \right\rceil,\ Y \le \left\lceil \frac{R}{n} \right\rceil$$

According to the variable setting, when performing the encryption of the plaintext index, the encryption may be processed with a ciphertext matrix having a preset size of X×Y, and additionally, the encryption key ciphertext array having a size of Y in the form of the encrypted key may also be generated.

Referring to FIG. 4, the encryption index is configured so that the X and Y values for Col 1 are set to 4 and 2, respectively, and the X and Y values for Col 2 are set to 2 and 2, respectively. As a result, it is preferable that each value is selected as values that are easy to search while minimizing the value of Y.

When such a separate index is configured in the form of a file, the result of the entire database size or x*⌈R/n⌉ ciphertexts is transmitted in the existing database processing method, whereas the processing result of the database 200 according to an embodiment of the present disclosure enables the index and result provision of the query even if only x*⌈Y/n⌉ ciphertexts are transmitted. Since Y is less than or equal to the total number of rows R of the fully homomorphic encrypted structured database and is often much smaller than the total number of data N, it can be seen that the communication volume between the client 100 and the database 200 may be significantly reduced on average by using index data according to an embodiment of the present disclosure.

Meanwhile, referring back to FIG. 2, after the plaintext index and the encryption index are built, the database 200 identifies the query information requested from the client 100 (S105).

Here, the query information may include index condition information requesting a specific value of the fully homomorphic encrypted structured database.

The database 200 indexes the encryption index in response to the query information (S107), acquires the search result data through the homomorphic operation corresponding to the result value indexed by the encryption index (S109), and provides the search result data to the client 100 (S111).

As illustrated in FIG. 4 above, each search query may first be compared and indexed in response to an encryption key, and then the search result data of the plaintext index may be acquired by homomorphically multiplying the index result data compared to the encryption index.

FIGS. 5 to 8 are diagrams for exemplarily describing a process of generating a plaintext index and an encryption index according to an embodiment of the present disclosure.

First, referring to Table 1 below, the overall process of generating the encryption index for the plaintext index may be exemplified as the following pseudocode.

TABLE 1

```
Given Plaintext Index I = [k_1:v_1, k_2:v_2, ... , k_k:v_k]
v_MAX ← max([dim(v_1), dim(v_2), ... , dim(v_k)])
X ← n < v_MAX ? n : min(k, v_MAX)
Y ← ⌈ ( Σ_{i∈[1,k]} ⌈dim(v_i) / X⌉ ) / n ⌉
enc_key ← vector (size Y)
```

TABLE 1-continued

```
enc_index ← matrix (size X × Y)
key_queue = sorted([k_1, k_2, ... , k_n])
while I key_queue.empty ( )
  k ← key_queue.dequeue ( )
  if k = = 0: continue
  place k to next available slot in enc_key
  v ← I (k)
  for i = 0 to X−1
    place available v[i] to next available alot for enc_ index[i]
  if v.size ( ) > 0
    if key_queue.size ( ) < X−1: key_queue.enqueue (0)
    key_queue.enqueue (k)
  if ciphertext is full
    encrypt enc_key, enc_index
    sort (key_queue)
```

Figure 5:
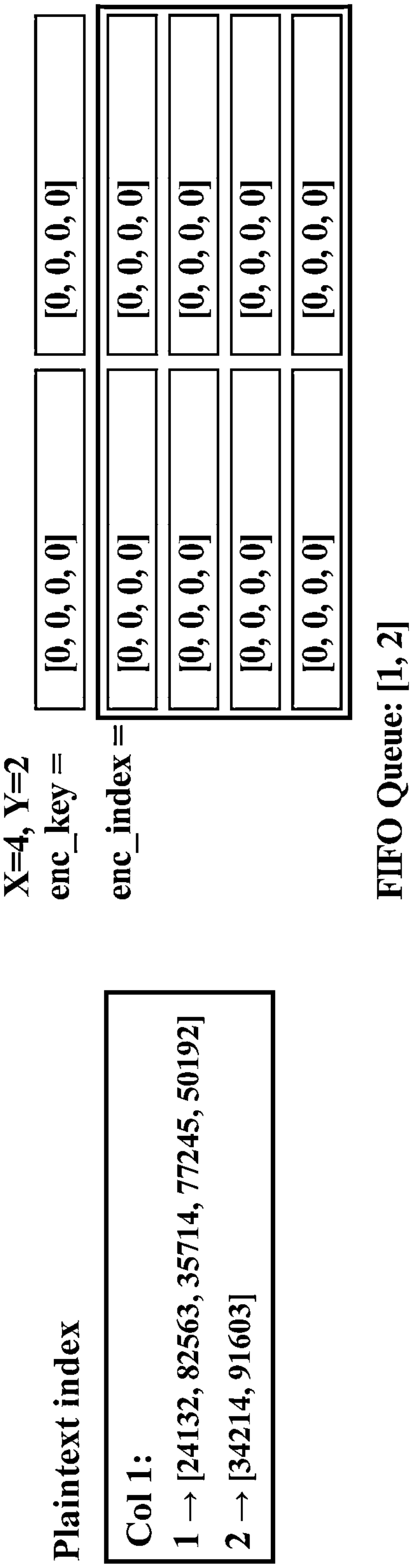
FIGS. 5 to 8 are diagrams for exemplarily describing a process of generating a plaintext index and an encryption index according to an embodiment of the present disclosure.

Accordingly, referring to FIG. 5, first, after calculating X, Y variable values according to the plaintext indexing described above, the database 200 is configured to set the sizes of the encryption key and the encryption index, and list and insert the representative keys of the plaintext index in the order of the size of the corresponding set of each representative key into the array in the form of a FIFO queue, thereby configuring the X, Y variables, the encryption key table, the encryption index table, and the FIFO queue as illustrated in FIG. 5.

Figure 6:
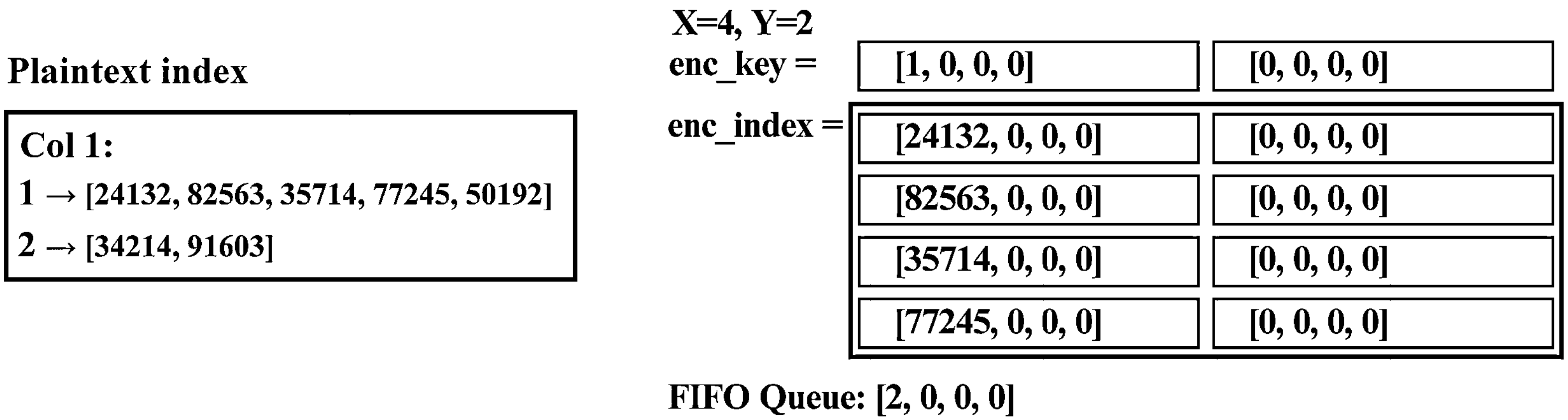

Referring to FIG. 6, the database 200 is configured to extract one representative key from the FIFO queue, insert the extracted representative key into a next storable slot of the encryption key, extract x data from the data set for the corresponding representative key from the plaintext index, and insert the extracted x data in order for each row of the encryption index.

In this case, when data remains in the set even after extracting X data, database 200 may insert the representative key again into the back of the FIFO queue. When the size of the FIFO queue is less than X−1, 0 is inserted until the size becomes X−1, and then the representative key is inserted. The processing result according to this is illustrated in FIG. 6.

Figure 7:
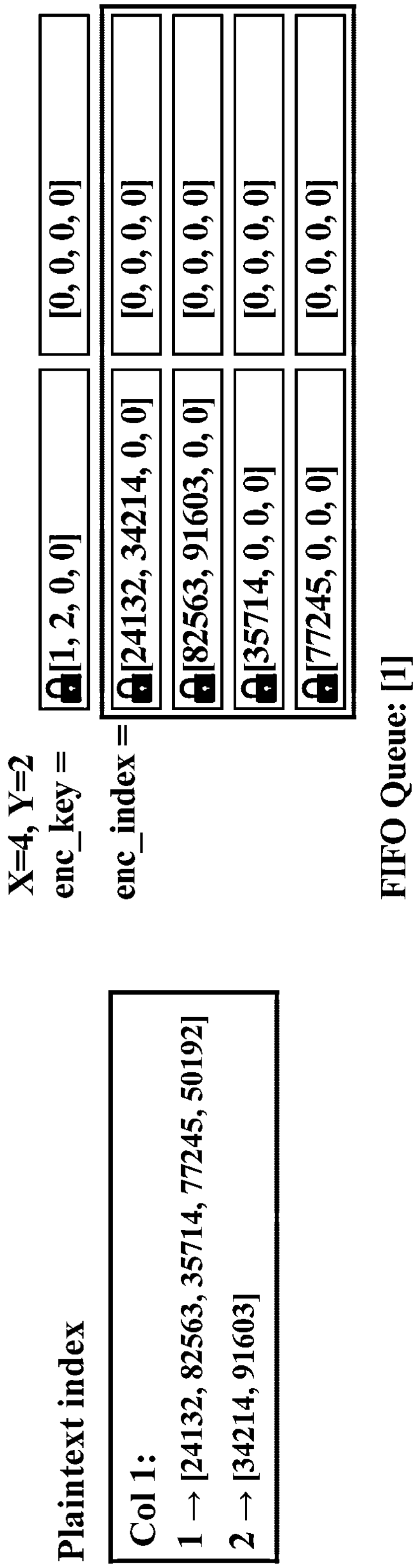

Thereafter, referring to FIG. 7, by repeating the processing process described in FIG. 6 described above n times, the prepared encryption key and the plaintext of the encryption index may be encrypted. FIG. 7 illustrates the data situation after the encryption process.

Figure 8:
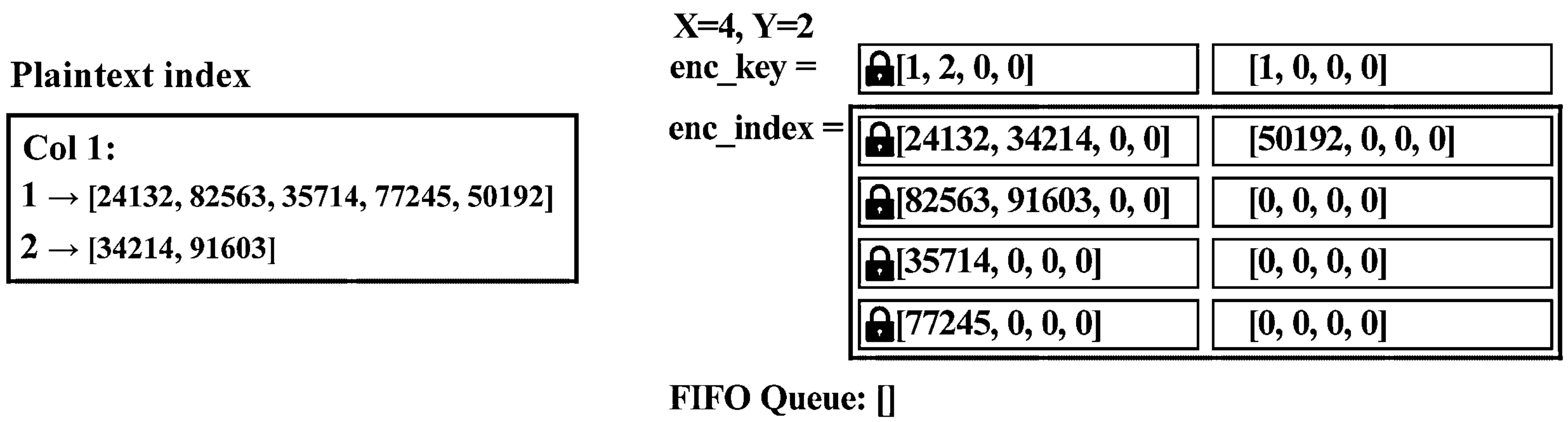

The database 200 may repeatedly process the processing processes of FIGS. 6 and 7 until the size of the FIFO queue becomes 0. The result of the final encryption index according to this is illustrated in FIG. 8, in which the FIFO queue is empty, and the finally optimized encryption key and encryption index are built and may be configured to be mapped to the plaintext index.

Figure 9:
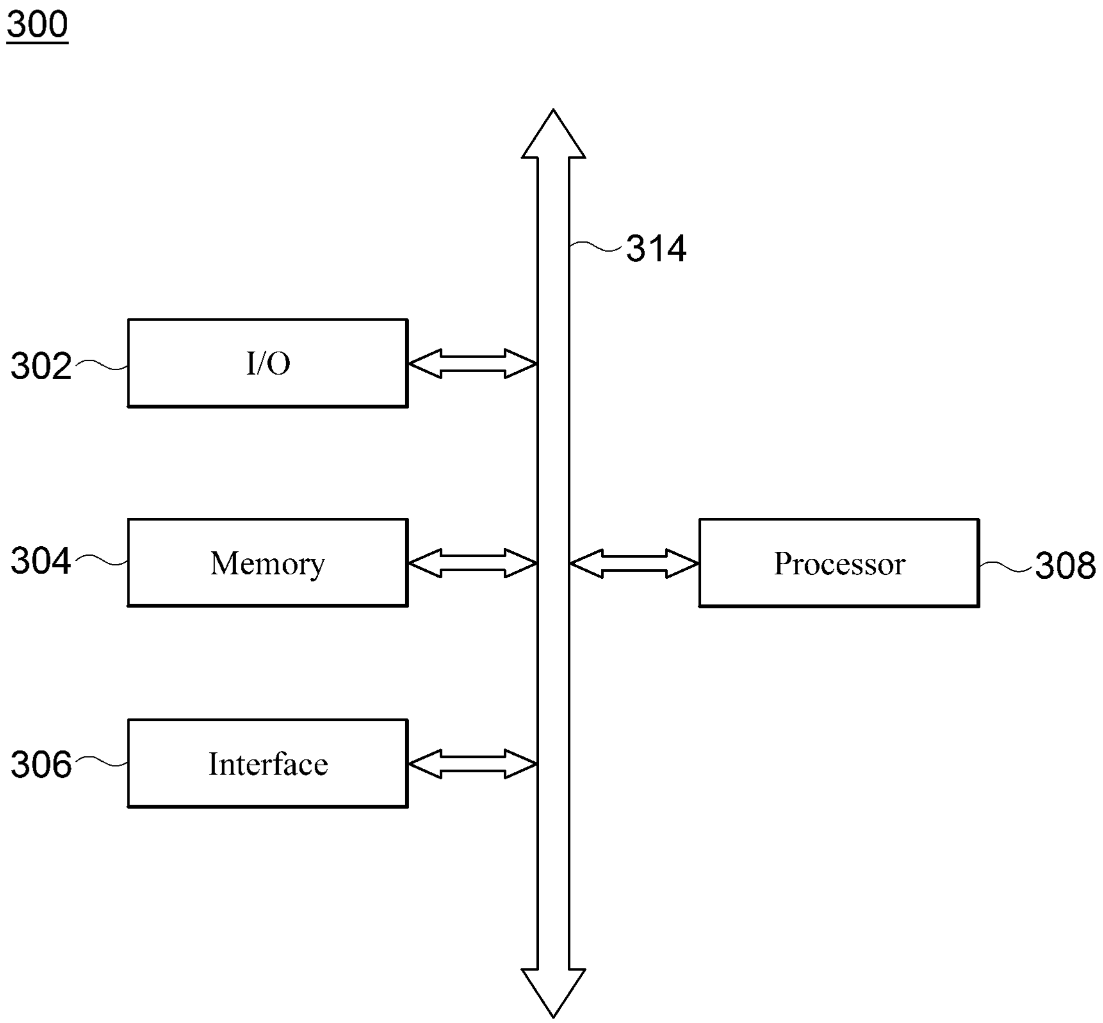
FIG. 9 is a block diagram illustrating a configuration of a computing device according to an embodiment of the present disclosure.

Meanwhile, FIG. 9 is a block diagram illustrating a configuration of a computing device according to an embodiment of the present disclosure.

Referring to FIG. 9, the client 100 and the database 200 may be implemented as a computing device 300. At least one of each module constituting the computing device 300 according to an embodiment of the present disclosure is implemented on a general-purpose computing processor and thus may include a processor 308, an input/output I/O 302, a memory 304, an interface 306, and a bus 314. The processor 308, the input/output device 302, the memory 304, and/or the interface 306 may be coupled to each other via the bus 314. The bus 314 corresponds to a path through which data moves.

Specifically, the processor 308 may include at least one of a central processing unit (CPU), a micro processor unit (MPU), a micro controller unit (MCU), a graphic processing unit (GPU), a microprocessor, a digital signal processor, a microcontroller, an application processor (AP), and logic devices capable of performing functions similar thereto.

The input/output device 302 may include at least one of a keypad, a keyboard, a touchscreen, and a display device. The memory device 304 may store data and/or programs, etc.

The interface 306 may perform a function of transmitting data to or receiving data from a communication network. The interface 306 may be wired or wireless. For example, the interface 306 may include an antenna or a wired/wireless transceiver, etc. The memory 304 may further include a high-speed DRAM and/or SRAM, etc., as a volatile operating memory for improving the operation of the processor 308 and protecting personal information.

In addition, the memory 304 stores programming and data configurations that provide the functions of some or all of the modules described herein. For example, it may include logic to perform selected aspects of the learning method described above.

A program or application is loaded as a set of instructions that includes each step of performing the acquisition method described above stored in the memory 304, and causes the processor to perform each step.

Furthermore, various exemplary embodiments described herein may be implemented in computer-readable recording medium using, for example, software, hardware, or a combination thereof.

According to a hardware implementation, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for executing other functions. In some cases, embodiments described herein may be implemented as a control module itself.

According to a software implementation, embodiments such as procedures and functions described herein may be implemented as separate software modules. Each of the software modules may execute one or more functions and operations described herein. A software code may be implemented as a software application written in a suitable programming language. The software code may be stored in a memory module and executed by a control module.

According to an embodiment of the present disclosure, by pre-building the plaintext index corresponding to the fully homomorphic encrypted structured database and homomorphically encrypting the plaintext index to generate the encryption index, it is possible to efficiently perform the query search and reduce the maximum number of provided ciphertexts accordingly.

Accordingly, the present disclosure can provide the query information processing method capable of reducing the data size of the query search results and improving the transmission efficiency accordingly, and the computing device for performing the same.

The spirit of the present disclosure has been described only by way of example hereinabove, and the present disclosure may be variously modified, altered, and substituted by those skilled in the art to which the present disclosure pertains without departing from essential features of the present disclosure.

Accordingly, embodiments disclosed in the disclosure and the accompanying drawings are provided in order to describe the technical spirit of the disclosure rather than limiting the technical spirit of the disclosure, and the scope of the disclosure is not limited by these embodiments and the accompanying drawings. The scope of the disclosure should be interpreted by the following claims, and it should be interpreted that all spirits equivalent to the following claims fall within the scope of the disclosure.

What is claimed is:

1. A query information processing method of a database performed on a computing device, comprising:

pre-building a plaintext index corresponding to a fully homomorphic encrypted structured database;

determining a block size for partitioning records based on a comparison between a data capacity of a single ciphertext and a maximum size among sets of records, wherein, when the maximum size exceeds the data capacity, dimensions of a ciphertext matrix are determined based on the data capacity and a cumulative size derived from dividing each set of records by the data capacity, so as to minimize a total number of ciphertexts required for an encrypted index;

partitioning the records into a plurality of row blocks having the determined block size;

generating the encrypted index by homomorphically encrypting the plaintext index in a form of the ciphertext matrix in which each element corresponds to a respective row block and a respective key value;

identifying query information requested from a client;

searching the encrypted index in response to the query information;

acquiring search result data through a homomorphic operation that selectively retrieves ciphertexts corresponding to row blocks associated with a key value matching the query information; and providing the search result data to the client.

2. The query information processing method of claim 1, wherein the plaintext index includes a set of key values of records dependent on each data value existing in each column of the fully homomorphic encrypted structured database.

3. The query information processing method of claim 2, wherein the plaintext index maps the set of key values to one index.

4. The query information processing method of claim 3, wherein a maximum value of a number of sets of key values mapped to the index has a limited size according to a total number of records of the fully homomorphic encrypted structured database and a total number of rows of the fully homomorphic encrypted structured database.

5. The query information processing method of claim 1, wherein the generating of the encrypted index includes encrypting the plaintext index with the ciphertext matrix, wherein the ciphertext matrix has a preset size according to row variables and column variables.

6. The query information processing method of claim 5, wherein the encrypting further includes generating an encrypted key array to which encrypted representative keys are mapped according to the encrypting.

7. A computing device, comprising:

a processor; and a memory communicating with the processor, wherein the memory stores instructions that cause the processor to perform operations, and the operations include:

an operation of pre-building a plaintext index corresponding to a fully homomorphic encrypted structured database;

an operation of determining a block size for partitioning records based on a comparison between a data capacity of a single ciphertext and a maximum size among sets of records, wherein, when the maximum size exceeds the data capacity, dimensions of a ciphertext matrix are determined based on the data capacity and a cumulative size derived from dividing each set of records by the data capacity, so as to minimize a total number of ciphertexts required for an encrypted index;

an operation of partitioning the records into a plurality of row blocks having the determined block size;

an operation of generating the encrypted index by homomorphically encrypting the plaintext index in a form of the ciphertext matrix in which each element corresponds to a respective row block and a respective key value;

an operation of identifying query information requested from a client;

an operation of searching the encrypted index in response to the query information;

an operation of acquiring search result data through a homomorphic operation that selectively retrieves ciphertexts corresponding to row blocks associated with a key value matching the query information; and an operation of providing the search result data to the client.

8. The computing device of claim 7, wherein the plaintext index includes a set of key values of records dependent on each data value existing in each column of the fully homomorphic encrypted structured database.

9. The computing device of claim 8, wherein the plaintext index maps the set of key values to one index.

10. The computing device of claim 9, wherein a maximum value of a number of sets of key values mapped to the index has a limited size according to a total number of records of the fully homomorphic encrypted structured database and a total number of rows of the fully homomorphic encrypted structured database.

11. The computing device of claim 7, wherein the operation of generating the encrypted index includes an operation of encrypting the plaintext index with the ciphertext matrix, wherein the ciphertext matrix has a preset size according to row variables and column variables.

12. The computing device of claim 11, wherein the encrypting operation further includes an operation of generating an encrypted key array to which encrypted representative keys are mapped according to the encrypting.

13. A non-transitory computer-readable recording medium in which a computer program for causing a computing device to execute a method, the method comprising:

pre-building a plaintext index corresponding to a fully homomorphic encrypted structured database;

determining a block size for partitioning records based on a comparison between a data capacity of a single ciphertext and a maximum size among sets of records, wherein, when the maximum size exceeds the data capacity, dimensions of a ciphertext matrix are determined based on the data capacity and a cumulative size derived from dividing each set of records by the data capacity, so as to minimize a total number of ciphertexts required for an encrypted index;

partitioning the records into a plurality of row blocks having the determined block size;

generating the encrypted index by homomorphically encrypting the plaintext index in a form of the ciphertext matrix in which each element corresponds to a respective row block and a respective key value;

identifying query information requested from a client;

searching the encrypted index in response to the query information;

acquiring search result data through a homomorphic operation that selectively retrieves ciphertexts corresponding to row blocks associated with a key value matching the query information; and providing the search result data to the client.

* * * * *